United States Patent [19]

Inoue et al.

[11] Patent Number: 5,381,235
[45] Date of Patent: Jan. 10, 1995

[54] THREE-DIMENSIONAL SHAPE MEASURING DEVICE AND THREE-DIMENSIONAL SHAPE MEASURING SENSOR

[75] Inventors: Yasuo Inoue; Tadashi Nishimura; Takashi Ipposhi; Toshiaki Iwamatsu, all of Itami, Japan

[73] Assignee: Mitsubishi Denki Kabushiki Kaisha, Tokyo, Japan

[21] Appl. No.: 990,460

[22] Filed: Dec. 15, 1992

[30] Foreign Application Priority Data

Dec. 26, 1991 [JP] Japan ................... 3-344771

[51] Int. Cl.⁶ .......................... G01B 11/24
[52] U.S. Cl. ........................................ 356/376
[58] Field of Search ............... 356/376; 307/234, 353; 328/129.1; 368/121

[56] References Cited

U.S. PATENT DOCUMENTS

| | | | |
|---|---|---|---|
| 2,269,603 | 1/1942 | Rockwood | 368/121 |
| 2,485,584 | 10/1949 | Ginzton | 368/121 |
| 4,794,262 | 12/1988 | Sato et al. | 356/376 |
| 4,982,102 | 1/1991 | Inoue et al. | 356/376 |
| 4,993,835 | 2/1991 | Inoue et al. | 356/376 |

Primary Examiner—Richard A. Rosenberger
Attorney, Agent, or Firm—Leydig, Voit & Mayer

[57] ABSTRACT

The present invention provides a three-dimensional shape measuring device and a sensor employed for the three-dimensional shape measuring device. The three-dimensional shape measuring device comprises a light source for scanning plane light over the surface of an object, an image sensor opposed to the object and provided with a plurality of pixels, an optical system for forming an image of a bright line appearing on the surface of the object due to plane light on the image sensor, a plurality of capacitors installed in association with pixels of the image sensor, a charger for storing given charges in a plurality of capacitors before plane light scanning starts, a plurality of dischargers lying in association with capacitors and gradually discharging the capacitors for pixels corresponding to a bright line image from when plane light scanning starts until the bright line image passes through the pixels, and an arithmetic logic means for computing charges remaining in the plurality of capacitors after plane light scanning is completed and thus providing a three-dimensional shape of an object. Thereby, a three-dimensional shape of an object can be measured at a high speed with high precision.

16 Claims, 8 Drawing Sheets

F I G. 1
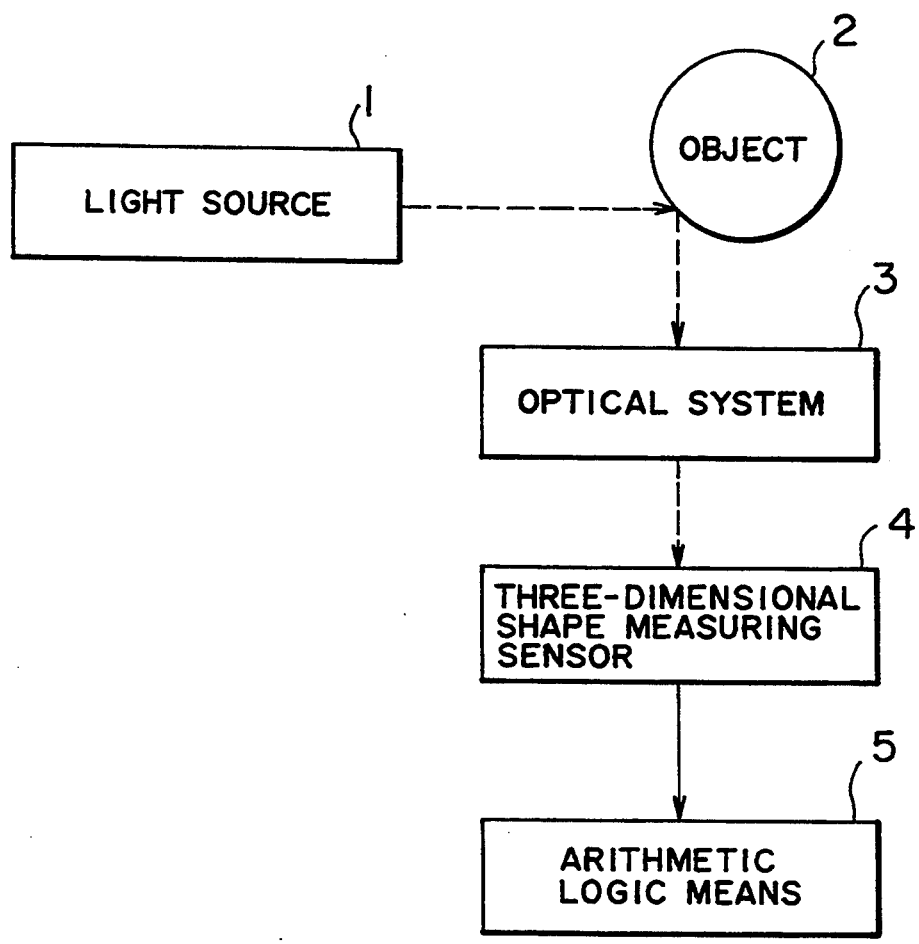

THREE-DIMENSIONAL SHAPE MEASURING DEVICE AND THREE-DIMENSIONAL SHAPE MEASURING SENSOR

BACKGROUND OF THE INVENTION

1. Field of the Invention

The present invention relates to a three-dimensional shape measuring device for measuring a three-dimensional shape of an object using the principles of triangulation, and a sensor employed for the measurement.

2. Description of the Related Art

A conventional procedure of measuring a three-dimensional shape of an object using the light-section method will be described in conjunction with FIG. 7. A mirror 43 is arranged forward of a laser source 41 that emits plane light, and an object 44 to be measured is placed forward of the mirror 43. An image sensor 45 is opposed to the object 44.

The laser source 41 emits plane light. Then, the plane light reflected from the mirror 43 irradiates the object 44 to create a bright line 46 on the surface of the object 44. An image 47 of the bright line 46 is projected on the image sensor 45 by a condenser that is not shown. For example, a point 49 on the bright line 46 corresponds to a point 50 of the image 47 on the image sensor 45. An equation representing the plane light 42 for irradiating the object 44 is determined with a deflection angle of the mirror 43. On the other hand, the point 49 on the bright line 46 lies on a straight line 51 linking the point 50 on the image 47 and the center point 52 of the condenser. An equation representing the straight line 51 is determined with the coordinates of a pixel 48 of the image sensor 45 corresponding to the point 50 of the image 47 and the coordinates of the center point 52 of the condenser. Then, the simultaneous equations of the equation representing the plane light 42 and that representing the straight light 51 are solved to calculate the three-dimensional coordinates the intersection 49 between the plane light 42 and straight line 51. Similarly, coordinates of points on the bright line 46 are calculated according to the resolution of the image sensor 45.

When the mirror 43 is rotated to move the plane light 42 for irradiating the object 44, the bright line 46 appearing on the surface of the object 44 moves on the surface. FIG. 7 plots the bright line 46 moving on the surface of the object 44, and the image 47 moving on the image sensor 45 in synchronization with the movement of the bright line 46. Then, the angle of the mirror 43 is varied incrementally. Every time the mirror 43 changes its angle, the coordinates of points on the bright line 46 appearing on the surface of the object 44 are calculated. Thus, three-dimensional coordinates constituting the whole object 44 are provided.

The three-dimensional shape of the object 44 can be measured as mentioned above. However, to obtain the three-dimensional coordinates of the whole object 44, several tens or hundreds of images 47 must be acquired using the image sensor 45. Consequently, it takes too much time to measure the coordinates constituting the whole object 44. Real-time processing is difficult to achieve at a rate of 30 frames per second.

To shorten the processing time, U.S. Pat. No. 4,794,262 has proposed a new procedure based on the light-section method shown in FIG. 8. A laser beam emitted from a laser oscillator 61 is expanded in the Form of a plane by a lens 62, then reflected from a polygon mirror 63 rotating at a certain angular speed to irradiate an object 64. An image of a bright line appearing on the object 64 is formed on an image surface 71 of an image sensor 70 in an imaging unit 69. A photosensor 65 is placed in the vicinity of the polygon mirror 63. When the rotation angle of the polygon mirror 63 comes to meet a reference value, light reflected from the polygon mirror 63 enters the photosensor 65. The photosensor 65 outputs a reset signal to a timer 67 and to a counter 68 respectively. Thereby, the timer 67 and counter 68 start up. The timer 67 generates clock pulses and the counter 68 counts the clock pulses. That is to say, an angle of deviation of the polygon mirror 63 from the reference angle is represented as a duration or an output of the counter 68. Therefore, an equation representing plane light can be satisfied with the output value of the counter 68.

When a bright line image crosses pixels on the image plane 71 of the image sensor 70, an output value the counter 68 provided at that time is latched and put in a memory unit 72. Similarly, before the plane light completes a sequence of scanning the surface of the object 64, durations for pixels are put in the memory unit 72 of the imaging unit 69 consecutively. Then, when the scanning is completed, the values of the durations are read from the memory unit 72 sequentially. A data processor 73 calculates coordinates of points on the surface of the object 64 corresponding to pixels. Thus, three-dimensional coordinates constituting the whole object 64 are provided.

In the method shown in FIG. 8, the whole object 64 can be measured merely by scanning plane light over it once. This results in greatly-reduced measurement time.

However, to improve precision in shape measurement, a minimum unit for the clock pulses that the timer 67 generates must be reduced to upgrade resolution of time measurement. For example, the whole scanning time required for a sequence of scanning plane light should be resolved into $4096 = 2^{12}$ durations rather than $2048 = 2^{11}$ durations. Higher resolution results in finer durations, thus realizing high-precision shape measurement. Then, in order to resolve the whole scanning time into 4096 durations and measure the durations, lines each capable of transmitting at least 12 bits must tie connected to the counter 68 in association with the pixels of the image sensor 70. Thereby, durations are fetched as the outputs of the counter 68. Then, an LSI wiring technology must be employed to connect such lines between pixels. Thereby, an area occupied by the lines must be expanded, while an area occupied by the pixels must be shrunk. That is to say, when an effort is made to improve precision in time measurement, the numerical aperture of image sensor deteriorates. Consequently, a bright line image cannot be acquired with high precision.

SUMMARY OF THE INVENTION

The object of the present invention is to solve the aforesaid problems or to provide a three-dimensional measuring device capable of measuring a three-dimensional shape of an object at a high speed with high precision and a three-dimensional shape measuring sensor employed for the measurement.

A first three-dimensional shape measuring device comprises a light source for scanning plane light over the surface of an object, an image sensor opposed to an object and provided with a plurality of pixels, an optical system for forming an image of a bright line appearing on the surface of the object due to plane light on the image sensor, a plurality of capacitors installed in association with pixels of the image sensor, a charging means for storing given charges in a plurality of capacitors before plane light scanning starts, a plurality of discharging means lying in association with capacitors and discharging the capacitors for pixels corresponding to a bright line image gradually from when plane light scanning starts until the bright line image passes through the pixels, and an arithmetic logic means for computing charges remaining in the plurality of capacitors after plane light scanning is completed and thus providing a three-dimensional shape of an object.

A second three-dimensional shape measuring device comprises a light source for scanning plane light over the surface of an object, an image sensor opposed to an object and provided with a plurality of pixels, an optical system for forming an image of a bright line appearing on the surface of an object due to plane light on the image sensor, a plurality of capacitors installed in association with pixels of the image sensor, a discharging means for discharging a plurality of capacitors before plane light scanning starts, a plurality of charging means installed in association with the capacitors and used for charging capacitors for pixels corresponding to a bright line image gradually from when plane light scanning starts until the bright line image passes through the pixels, and an arithmetic logic means for computing charges existent in a plurality of capacitors after plane light scanning is completed and thus providing a three-dimensional shape of the object.

A first three-dimensional shape measuring sensor comprises a plurality of photosensors arranged in two-dimensional order, a plurality of capacitors installed in association with the photosensors, a plurality of charging means for storing given charges in a plurality of capacitors, a plurality of discharging means for discharging a plurality of capacitors gradually, a discharge stopping means for stopping the discharging means to discharge their associated capacitors according to the output signals sent from their associated photosensors, and a plurality of reading means for reading charges remaining in the capacitors. Herein, the photosensors lie in the first layer, while the capacitors, charging means, discharging means, discharge stopping means, and reading means lie in the second layer. Thus, the first three-dimensional shape measuring sensor has a two-layer structure.

A second three-dimensional shape measuring sensor comprises a plurality of photosensors arranged in two-dimensional order, a plurality of capacitors installed in association with the photosensors, a plurality of discharging means for discharging a plurality of capacitors, a plurality of charging means for charging a plurality of capacitors gradually, a charge stopping means for stopping the charging means to charge their associated capacitors according to the output signals sent from their associated photosensors, and a plurality of reading means for reading charges stored in the capacitors. Herein, a two-layer structure is adopted so that the photosensors will lie in the first layer, and the capacitors, discharging means, charging means, charge stopping means, and reading means will lie in the second layer.

BRIEF DESCRIPTION OF THE DRAWINGS

FIG. 1 is a block diagram showing a three-dimensional shape measuring device according to the first embodiment of the present invention;

DESCRIPTION OF THE PREFERRED EMBODIMENTS

Embodiments of the present invention will be described in conjunction with the appended drawings.

Figure 7:
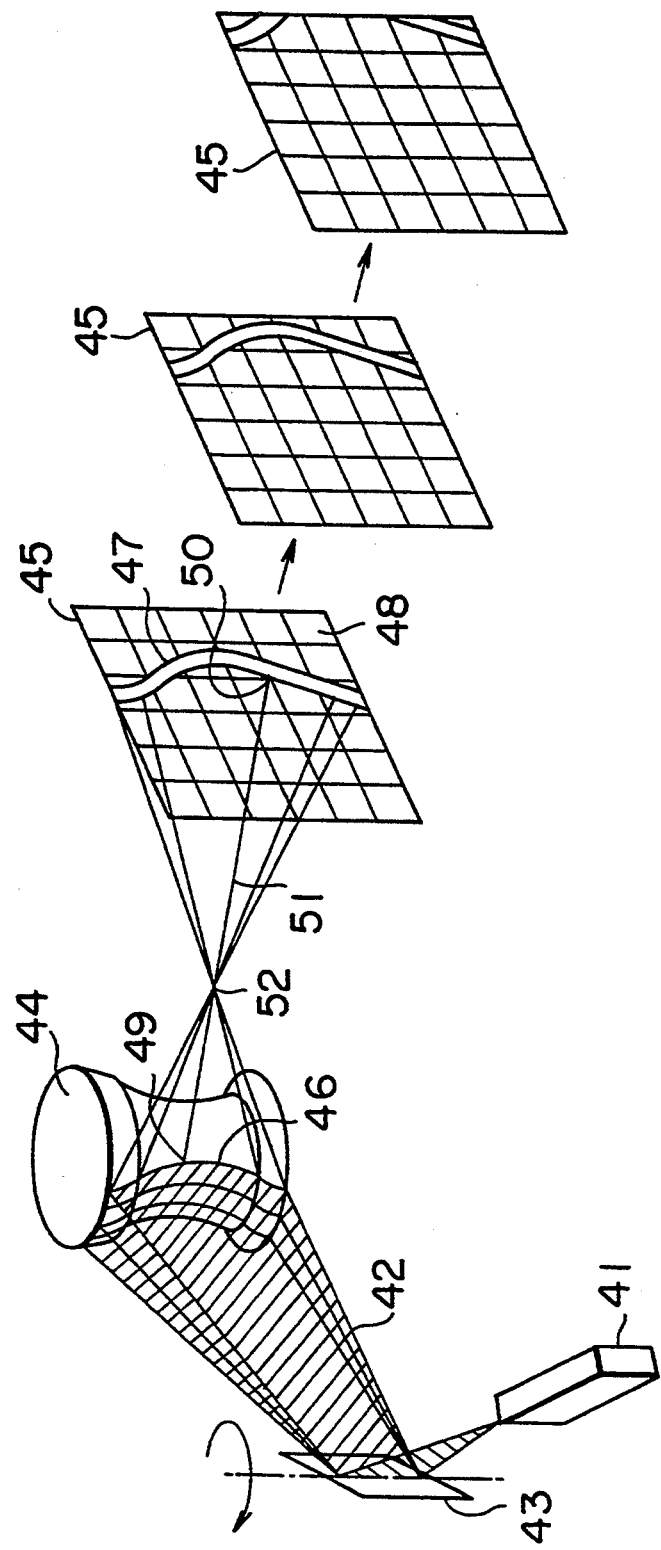
FIG. 7 shows a conventional three-dimensional shape measuring device.
Figure 8:
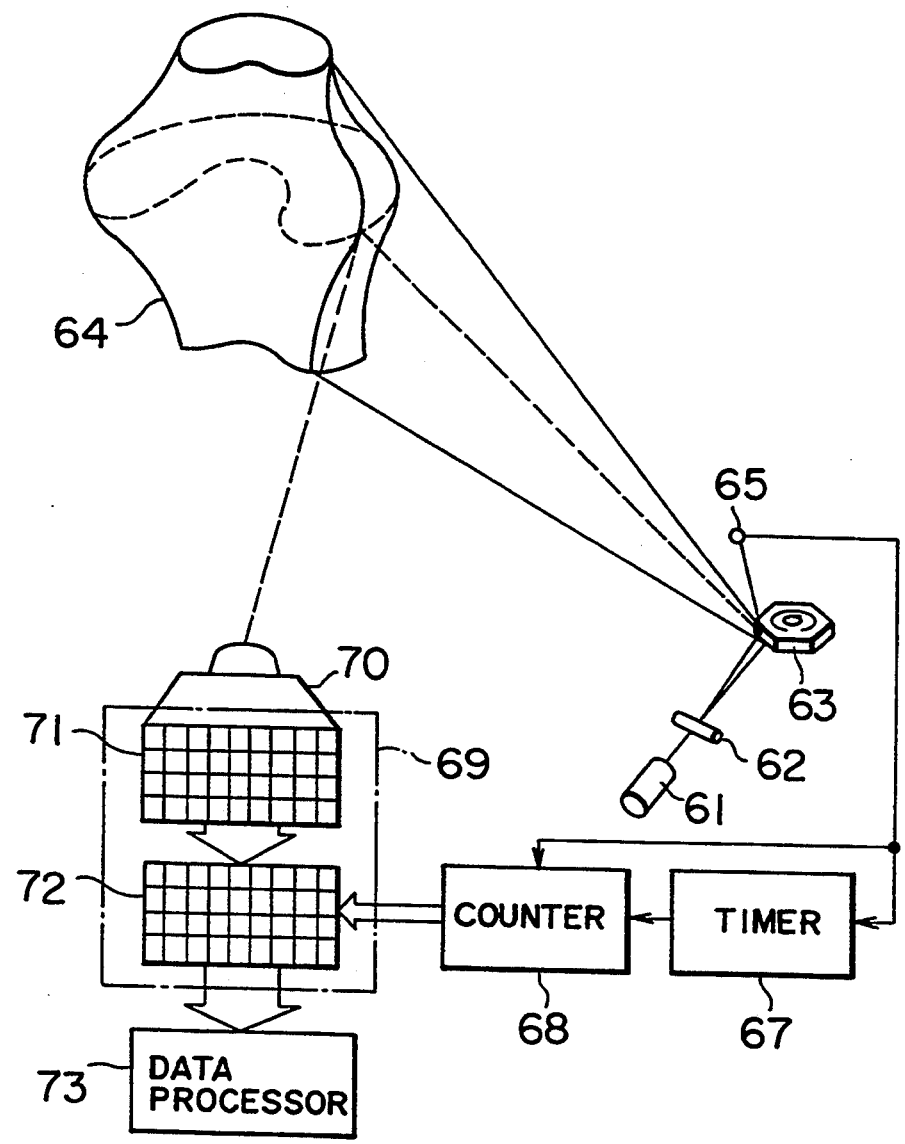
FIG. 8 shows another conventional three-dimensional shape measuring device.

In FIG. 1, a light source 1 radiates plane type light to an object 2 and scans the surface of the object 2 with the radiated light. To be more specific, the light source 1 is made up of a laser source 41 and a rotary mirror 43 that have, as shown in FIG. 7, been incorporated in a conventional device, or of a laser oscillator 61, a lens 62, and a rotary polygon mirror 63 that are shown in FIG. 8. A three-dimensional shape measuring sensor 4 is opposed to the object 2 via an optical system 3. The optical system 3 includes an optical lens and forms an image of a bright line appearing on the surface of the object 2 due to radiation of plane light on the three-dimensional shape measuring sensor 4. The three-dimensional shape measuring sensor 4 is connected to an arithmetic logic unit 5 for computing a three-dimensional shape of the object 2.

Figure 2:
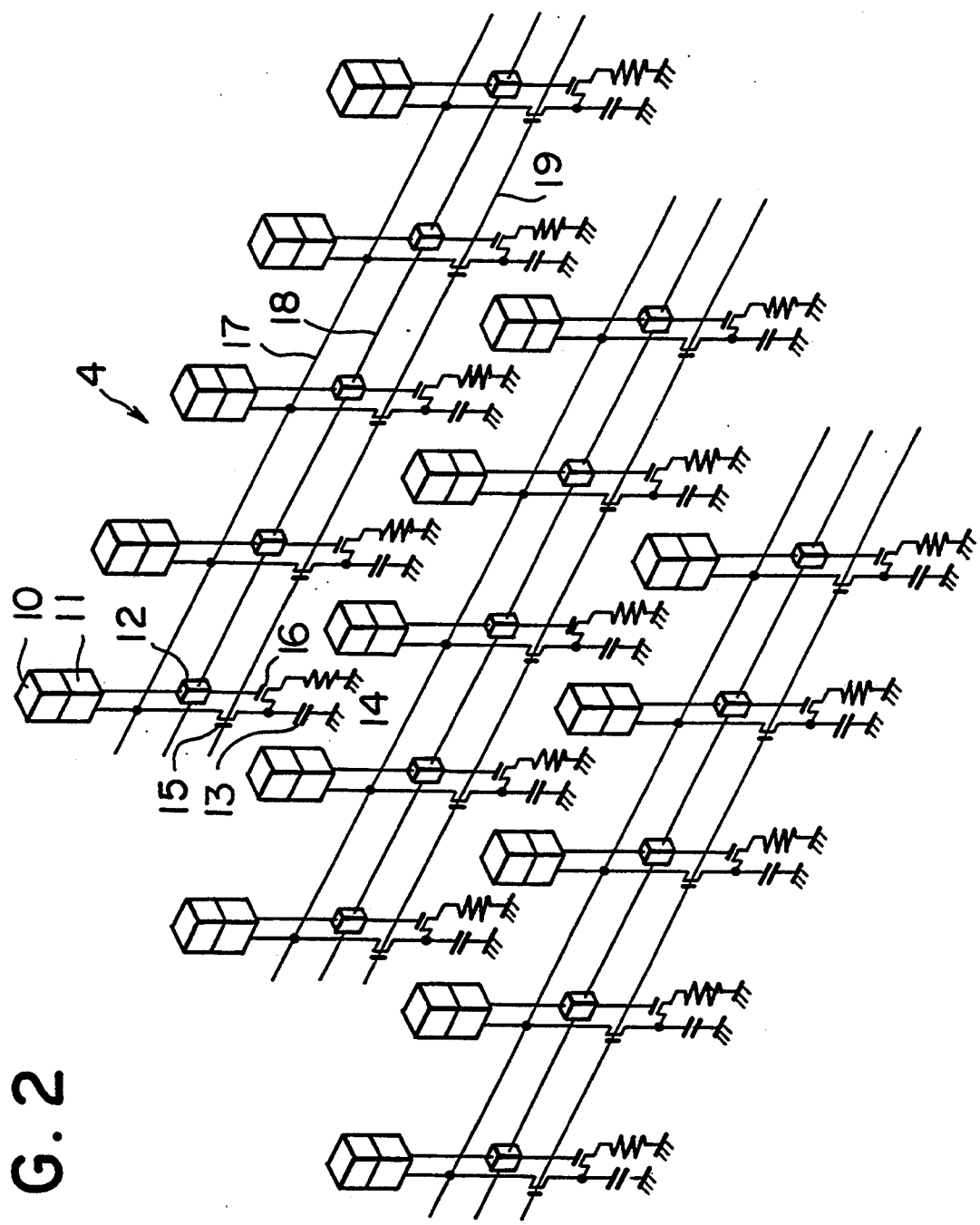
FIG. 2 shows a structure of a three-dimensional shape measuring sensor employed for the first embodiment.

FIG. 2 shows the structure of the three-dimensional shape measuring sensor 4. Multiple photosensors 10 forming pixels of the sensor 4 are arranged in two-dimensional order. Flip-flops 12 are connected to the photosensors 10 via level slicers 11. As shown in the enlarged view of FIG. 3, capacitors 13 are connected on power lines 17 via precharge switching transistors 15. The gates of the precharge switching transistors 15 are connected with precharge control lines 19. Contacts between the capacitors 13 and transistors 15 are grounded via discharge switching transistors 16 and discharge resistors 14. The gates of the discharge switching transistors 16 are connected to the output terminals of the flip-Flops. The contacts P are connected with charge transfer lines 20 via reading switching transistors 21 for reading charges stored in the capacitors 13. The flip-flops 12 are connected with reset lines 18.

The power lines 17 and recharge switching transistors 15 constitute a charging means. The discharge resistors 14 and discharge switching transistors 16 constitute a discharging means. The flip-flops 12 and discharge switching transistors 16 constitute a discharge stopping means. The reading switching transistors 21 and charge transfer lines 20 constitute a reading means.

These combinations or photosensors 10, level slicers 11, flip-flops 12, capacitors 13, discharge resistors 14, precharge switching transistors 15, discharge switching transistors 16, and reading switching transistors 21 are installed in association with pixels of the three-dimensional shape measuring sensor 4.

Figure 4:
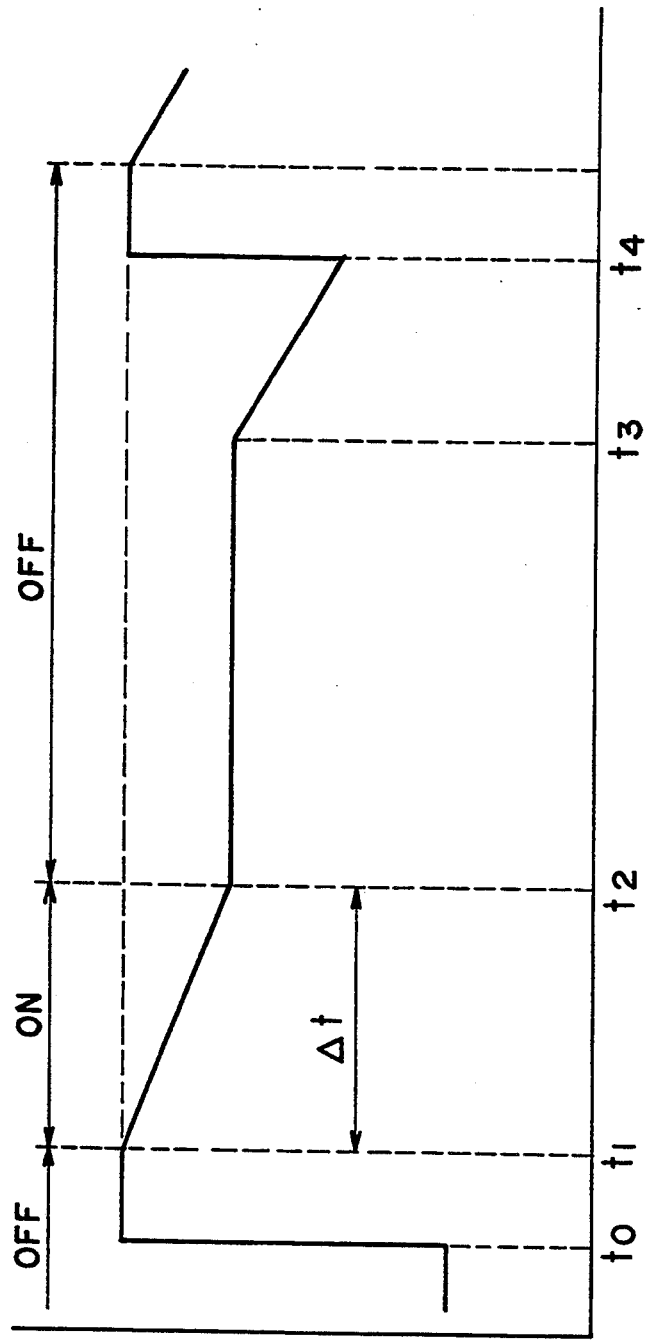
FIG. 4 is a timing chart showing the operations of the first embodiment.

Next, the operations of the first embodiment will be described with reference to the timing chart of FIG. 4. At a time to before plane light scanning starts, precharge control lines 19 are driven high to turn on precharge switching transistors 15. Thereby, power lines 17 and capacitors 13 are connected, then given charges are stored in the capacitors 13. After the capacitors 13 are thus charged, the precharge control lines 19 are driven low to disconnect the capacitors 13 from the power lines 17. A light source 1 starts scanning plane light at a time t1. At the same time, reset lines 18 are driven high to reset flip-flops 12. Thereby, discharge switching transistors 16 are turned on, and the capacitors 13 are discharged gradually via discharge resistors 14. The above operations involve all pixels and are executed at the same time.

Next, when a bright line image of an object 2 formed by an optical system 3 crosses a photosensor 10 of a pixel, the output of the photosensor 10 exceeds a threshold of the level slicer 11 and the level slicer 11 outputs a detected signal to the Flip-flop 12. Therefore, the Flip-flop 12 turns off the discharge switching transistor 16 at time t2. Then, discharging of the capacitor 13 is terminated. This operation is carried out every time a bright line image crosses a photosensor 10 associated with a pixel.

When plane light scanning is completed, reading switching transistors 21 are turned on at a time t3. Then, charges remaining in the capacitors 13 are read sequentially via charge transfer lines 20.

The thus-read remaining charges of the capacitors 13 are converted into digital signals by an arithmetic logic means 5. The remaining charge of each of the capacitors 13 corresponds to a duration Δt from when plain light scanning starts until a bright line image passes through the pixel associated with the capacitor. Using the remaining charge measured, an equation representing plane light forming a bright line image that has passed through the associated pixel can be solved. Then, the coordinates of the pixel and the coordinates of the center of the optical system 3 are assigned to calculate an equation representing a straight line that passes through the pixel and the center of the optical system 3. Then, the intersection between the plain light and straight line is detected. Thus, the three-dimensional coordinates of every point on a bright line of an object 2 can be calculated. Consequently, a three-dimensional shape of the object 2 is computed by the arithmetic logic means 5.

In the first embodiment, a remaining charge of each capacitor 13 corresponds to a duration Δt. Therefore, precision in measuring durations Δt depends on dispersion of capacitances of capacitors 18 and dispersion of resistances of discharge resistors 14. An LSI wafer process technology has made it possible to minimize these dispersions. Therefore, durations Δt can be measured with high precision. Level slicers 11 reference a given threshold to determine the on or off states of the optical signals that photosensors 10 receive. Consequently, a bright line image can be acquired without any influence of dispersion of the characteristics of the photosensors 10, and dispersion of the reflectances of the surface of the object 2.

A duration Δt is represented as an analog value of a charge. Therefore, once a single charge transfer line 20 is connected to a capacitor 13 associated with a pixel, the duration Δt for the pixel can be read. This minimizes an area occupied by lines in the three-dimensional shape measuring sensor 4.

Figure 5:
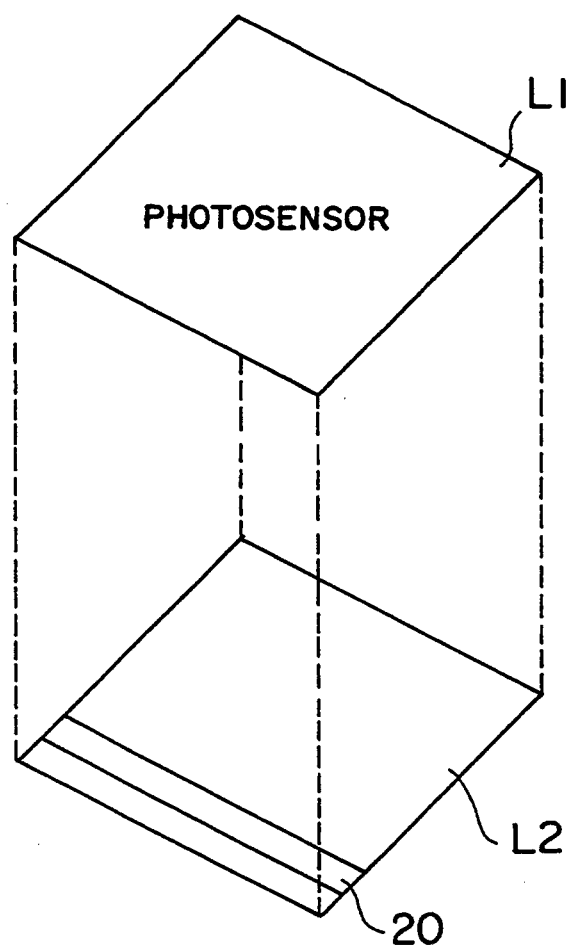
FIG. 5 is a layout of functions of a three-dimensional shape measuring sensor.

The three-dimensional shape measuring sensor 4 can be, as shown in FIG. 5, formed as a two-layer LSI made up of the first layer L1 and the second layer L2. Photosensors 10 of pixels are formed in the first layer L1, and flip-flops 12, capacitors 13, discharge resistors 14, precharge switching transistors 15, discharge switching transistors 16, reading switching transistors 21, power lines 17, reset lines 18, precharge control lines 19, and charge transfer lines 20 are formed in the second layer L2. Level slicers 11 may be placed in the first or second layer L1 or L2 according to the spaces of the layers. This two-layer structure helps the improvement of the till factor of the sensor drastically and permits high-precision measurement. In FIG. 5, only the power lines 20 are illustrated in the second layer L2 for convenience sake. The other members are omitted.

Figure 3:
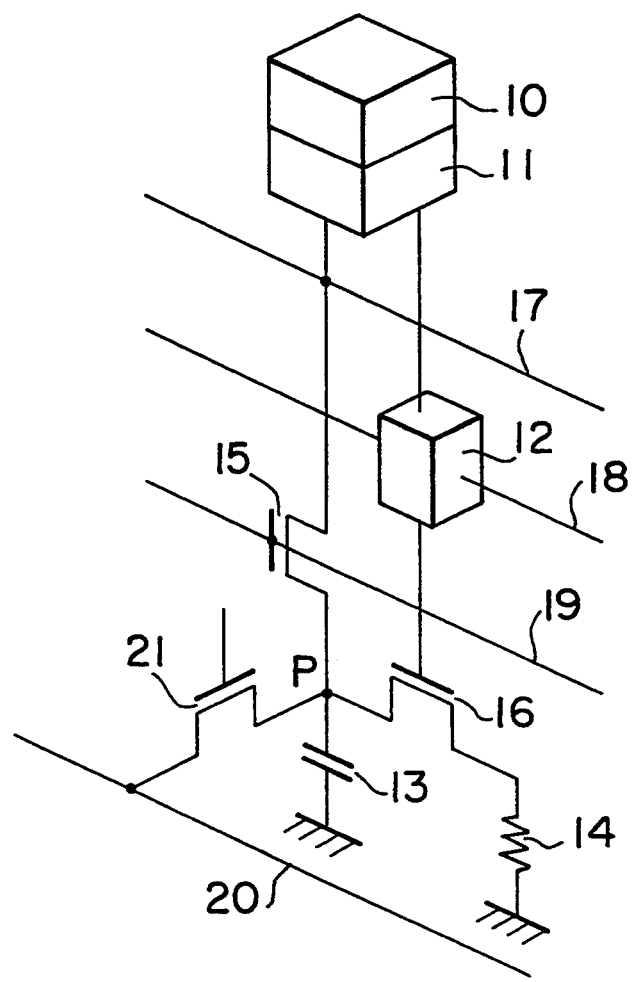
FIG. 3 is an enlarged view of a main section of the three-dimensional shape measuring sensor of FIG. 2.
Figure 6:
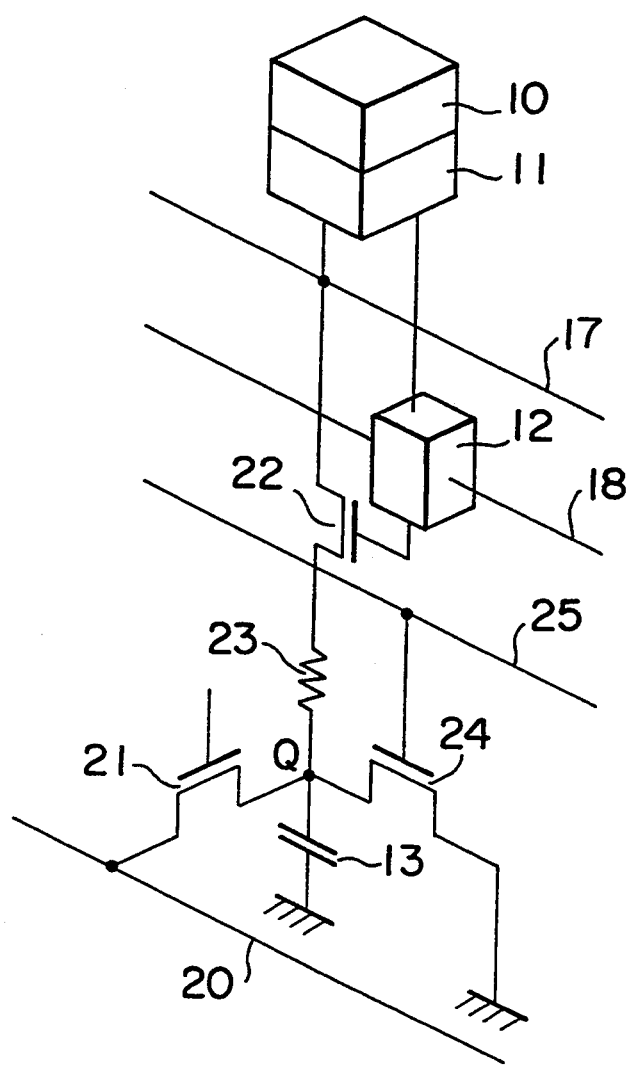
FIG. 6 is an enlarged view of a main section of a three-dimensional shape measuring sensor employed for the second embodiment.

FIG. 6 is an enlarged view of a main section of a three-dimensional shape measuring sensor employed for the second embodiment. In FIG. 6, members identical to those in FIG. 3 are assigned the same numerals. Similarly to the three-dimensional shape measuring sensor 4 shown in FIG. 2, multiple photosensors 10 are arranged in two-dimensional order. The photosensors 10 are connected to flip-flops 12 via level slicers 11. Series combinations of charge resistors 23 and capacitors 13 are connected with power lines 17 via charge switching transistors 22. The output terminals of the level slicers 11 are connected to the gates of the charge switching transistors 22. Contacts between the capacitors 13 and charge resistors 23 are grounded via discharge switching transistors 24. Charge transfer lines 20 are connected with the contacts Q via reading switching transistors 21. Discharge control lines 25 are connected with the gates of the discharge switching transistors 24.

The discharge switching transistors 24 constitute a discharging means. The power lines 17, charge switching transistors 22, and charge resistors 23 constitute a charging means. The flip-flops 12 and charge switching transistors 22 constitute a charge stopping means. The reading switching transistors 21 and charge transfer lines 20 constitutes a reading means.

The combinations of the photosensors 10, level slicers 11, flip-flops 12, capacitors 13, charge resistors 23, charge switching transistors 22, discharge switching transistors 24, and reading switching transistors 21 are installed in association with pixels.

In this three-dimensional shape measuring sensor, before plain light scanning starts, discharge control lines 25 are driven high to turn on discharge switching transistors 24. Thus, capacitors 13 are discharged. After that, discharge control lines 25 are driven low to turn off discharge switching transistors 24. Next, when plane light scanning starts, reset lines 18 are driven high to reset flip-flops 12. Thereby, charge switching transistors 22 are turned on. Then, the capacitors 13 are charged gradually with electricity coming From power lines 17 via charge resistors 23. The above operations involve all pixels and carried out at the same time.

Next, when a bright line image of an object crosses a photosensor 10 of a pixel, the output of the photosensor 10 exceeds a threshold specified in a level slicer 11. Then, the level slicer 11 outputs a detected signal to a flip-flop 12. Thereby, the flip-flop 12 turns off a charge switching transistor 22 to stop charging a capacitor 13.

This operation is carried out every time a bright line image crosses a photosensor 10 associated with a pixel.

After plane light scanning is completed, when the reading switching transistors 21 are turned on, charges stored in the capacitors 13 are read sequentially via the charge transfer lines 20. The arithmetic logic means 5 computes the thus-read charges of the capacitors 13 and thus provides a three-dimensional shape of the object 2.

In the second embodiment, a charge stored in each capacitor 13 corresponds to a duration $\Delta t$ in the first embodiment. The second embodiment has the same advantages as the first embodiment. The three-dimensional shape measuring sensor having the circuitry shown in FIG. 6 can also be formed as a two-layer LSI shown in FIG. 5. Photosensors for all pixels are formed in the first layer L1, and the other members are formed in the second layer. However, level slicers 11 may be placed either the first or second layer L1 or L2. This two-layer structure helps the improvement of the fill factor of the sensor drastically.

What is claimed is:

1. A three-dimensional shape measuring device, comprising:
   a light source for scanning plane light over the surface of an object;
   an optical system for forming an image of a bright line appearing on the surface of an object;
   a plurality of shape measurement units, each shape measurement unit including an image sensor opposed to the object and;
   defining a pixel, a capacitor having a first grounded terminal and a second terminal, discharging means connected to the capacitor for gradually discharging the capacitor from when plane light scanning starts until the bright line image passes through the pixel, the discharging means having 1) a discharge resistor including a first grounded terminal and a second terminal and 2) a plurality of interconnected discharge switching transistors, one of the discharge switching transistors having a gate and being connected to the second terminal of the discharge resistor and the second terminal of the capacitor; and
   an arithmetic logic means for computing charges remaining in said plurality of capacitors after plane light scanning is completed thus providing a three-dimensional shape of an object.

2. A three-dimensional shape measuring device according to claim 1 wherein said light source includes a laser source and a rotary mirror for reflecting a laser beam emitted frown the laser source, the rotary mirror rotating at a given angular speed.

3. A three-dimensional shape measuring device according to claim 1 wherein said charging means includes power lines and a plurality of charge switching transistors connected between the power lines and their associated capacitors.

4. A three-dimensional shape measuring device according to claim 1 wherein said image sensor includes a photosensor forming a pixel, a level slicer connected to the photosensor, and a flip-flop having an input terminal connected to the level slicer and an output terminal connected to the gate of the discharge switching transistor connected between the resistor and the capacitor.

5. A three-dimensional shape measuring device, comprising:
   a light source for scanning plane light over the surface of an object;
   an optical system for forming an image of a bright line appearing on the surface of an object;
   a plurality of shape measurement units, each shape measurement unit including an image sensor opposed to the object and defining a pixel, a capacitor having a first grounded terminal and a second terminal,
   a discharging means for discharging said capacitor before plane light scanning starts, charging means for gradually charging the capacitor from when plane light scanning starts until the bright line image passes through the pixel, the charging means including a switching transistor having first and second terminal and a gate the first terminal being connected to a power line, and a resistor connected to the switching transistor and to the capacitor; and
   an arithmetic logic unit for computing charges existent in the capacitor after plane light scanning is completed thus providing a three-dimensional shape of an object.

6. A three-dimensional shape measuring device according to claim 5 wherein said light source includes a laser source and a rotary mirror for reflecting a laser beam emitted from the laser source, the rotary mirror rotating at a given angular speed.

7. A three-dimensional shape measuring device according to claim 5 wherein said discharging means includes a discharge switching transistor having first and second terminals and a gate, the first terminal being grounded and the second terminal being connected to the second terminal of the capacitor.

8. A three-dimensional shape measuring device according to claim 5 wherein said image sensor includes a photosensor, a level slicer connected to the photosensor, and a flip-flop having an input terminal connected to the level slicer and an output terminal connected to the gate of the charge switching transistor.

9. A three-dimensional shape measuring sensor, comprising:
   a plurality of photosensors arranged in two-dimensional order;
   a plurality of capacitors connected in association with said plurality of photo sensors;
   a plurality of charging means for storing given charges in said plurality of capacitors;
   a plurality of discharging means for discharging said plurality of capacitors gradually;
   a discharge stopping means for stopping discharging means to discharge their associated capacitors according to the output signals sent from their associated photosensors; and
   a plurality of reading means for reading charges remaining in said plurality of capacitors;
   a two-layer structure being adopted so that said photosensors will lie in the first layer, and said capacitors, said charging means, said discharging means, said discharge stopping means, and said reading means will lie in the second layer.

10. A three-dimensional shape measuring sensor according to claim 9 wherein said charging means include charge switching transistors connected between their associated capacitors and power lines.

11. A three-dimensional shape measuring sensor according to claim 9 wherein said discharging means include discharge resistors having their terminals grounded and discharge switching transistors connected between the other terminals of the discharge resistors and their associated capacitors.

12. A three-dimensional shape measuring sensor according to claim 9 further comprising a plurality of level slicers connected to their associated photosensors, and a plurality of flip-flops having their input terminals connected to the level slicers and their output terminals connected to the gates of their associated discharge switching transistors.

13. A three-dimensional shape measuring sensor, comprising:
  a plurality of photosensors arranged in two-dimensional order;
  a plurality of capacitors installed in association with said photosensors;
  a plurality of discharging means for discharging said plurality of capacitors gradually;
  a charge stopping means for stopping said charging means to charge their associated capacitors according to the output signals of their associated photosensors; and
  a plurality of reading means For reading charges stored in said capacitors;
  a two-layer structure being adopted so that said photosensors will lie in the first layer, and said discharging means, said charging means, said charge stopping means, and said reading means will lie in the second layer.

14. A three-dimensional shape measuring sensor according to claim 13 wherein said discharging means include discharge switching transistors having their terminals grounded and the other terminals connected to their associated capacitors.

15. A three-dimensional shape measuring sensor according to claim 14 wherein said charging means includes series combinations connected between their associated capacitors and power lines, and made up of discharge switching transistors and discharge resistors.

16. A three-dimensional shape measuring sensor according to claim 15 further comprising a plurality of level slicers connected to their associated photosensors and a plurality of flip-flops having their input terminals connected to their associated level slicers and their output terminals connected to the gates of their associated charge switching transistors.

* * * * *

UNITED STATES PATENT AND TRADEMARK OFFICE
CERTIFICATE OF CORRECTION

PATENT NO. : 5,381,235
DATED : January 10, 1995
INVENTOR(S) : Inoue et al.

It is certified that error appears in the above-indentified patent and that said Letters Patent is hereby corrected as shown below:

Column 7, Line 51, change "frown" to --from--;

Column 9, Line 22, change "For" to --for--.

Signed and Sealed this

Fourth Day of April, 1995

Attest:

BRUCE LEHMAN

Attesting Officer     Commissioner of Patents and Trademarks